(12) United States Patent
Mattson et al.

(10) Patent No.: US 7,068,608 B2
(45) Date of Patent: Jun. 27, 2006

(54) AUTOMATED METHOD FOR CONNECTION DISCOVERY WITHIN CONSOLIDATED NETWORK ELEMENTS

(75) Inventors: James R Mattson, Kanata (CA); Dino B Fatica, Nepean (CA); LeRoy A Pick, Nepean (CA); Jose K. Kokkat, Ottawa (CA); Timothy P Munro, London (GB)

(73) Assignee: Nortel Networks Limited, St. Laurent (CA)

( * ) Notice: Subject to any disclaimer, the term of this patent is extended or adjusted under 35 U.S.C. 154(b) by 943 days.

(21) Appl. No.: 10/036,921

(22) Filed: Dec. 21, 2001

(65) Prior Publication Data

US 2003/0117962 A1 Jun. 26, 2003

(51) Int. Cl.
*G01R 31/08* (2006.01)
*G08C 15/00* (2006.01)
*H04L 12/26* (2006.01)
*H04L 12/28* (2006.01)

(52) U.S. Cl. ...................... 370/241; 370/254
(58) Field of Classification Search ............... 370/241, 370/248, 250, 389, 392, 400, 254
See application file for complete search history.

(56) References Cited

U.S. PATENT DOCUMENTS

| | | | | |
|---|---|---|---|---|
| 4,833,708 A | * | 5/1989 | Goodrich | 379/327 |
| 4,953,194 A | * | 8/1990 | Hansen et al. | 379/25 |
| 5,296,850 A | * | 3/1994 | King | 340/825.49 |
| 5,296,956 A | * | 3/1994 | Fatehi et al. | 398/33 |
| 5,638,357 A | * | 6/1997 | Glitho et al. | 370/250 |
| 5,841,759 A | * | 11/1998 | Russ et al. | 370/221 |
| 5,854,824 A | * | 12/1998 | Bengal et al. | 379/32.04 |
| 6,044,064 A | * | 3/2000 | Brimmage et al. | 370/248 |
| 6,049,529 A | * | 4/2000 | Brimmage et al. | 370/248 |
| 6,078,596 A | | 6/2000 | Wellbrock | |
| 6,229,540 B1 | | 5/2001 | Tonelli et al. | |

FOREIGN PATENT DOCUMENTS

EP 0 752 795 A2 1/1997
WO WO 02 073852 A2 9/2002

OTHER PUBLICATIONS

Macy, Terry, ITS Projects: Fiber Optics Basics, Ohio University, pp. 4 and 6-7, Apr. 16, 2000.*
Patent Abstracts of Japan, vol. 1997, No. 06, Jun. 30, 1997 & JP 09 036882 A (Fujitsu Ltd), Feb. 7, 1997 abstract.
Lang J P: "Link Management Protocol (LMP)" Internet Draft, Internet Engineering Task Force (IETF), 'Online!, Sep. 2001, pp. 1-59, XP002238578, Retrieved from the Internet: <URL:http://www.ietf.org/proceedings/Olaug/I-D/draft-ietf-mpls-lmp-02.txt>, 'retrieved on Apr. 16, 2003!, p. 2, paragraph 1. -p. 14, paragraph 5.1., paragraphs '9.4.1!, '9.4.2!, '9.6.1!, paragraphs '9.6.6!, '9.8.1!.

* cited by examiner

*Primary Examiner*—Chi Pham
*Assistant Examiner*—Kerri Dyke
(74) *Attorney, Agent, or Firm*—Pearne & Gordon LLP (57) ABSTRACT

An automated method of detecting, and provisioning connections between interconnected nodes in a consolidated network element involves sending messages between the nodes. The messages are inserted into data frames sent from respective transmit ports through inter-node links, to respective receive ports. The messages contain information used to provision the receive ports at which they are received, and information for identifying equipment that generated, transmitted, and conveyed the message, respectively, so that the connectivity of the interconnected nodes can be verified.

19 Claims, 4 Drawing Sheets

AUTOMATED METHOD FOR CONNECTION DISCOVERY WITHIN CONSOLIDATED NETWORK ELEMENTS

CROSS-REFERENCE TO RELATED APPLICATIONS

This is the first application filed for the present invention.

MICROFICHE APPENDIX

Not applicable.

TECHNICAL FIELD

The invention relates to the field of provisioning connections within consolidated network elements and, in particular, to a method for automating at least parts of the process of configuring or reconfiguring inter-node links between, and setting port parameters for, interconnected nodes within consolidated network elements.

BACKGROUND OF THE INVENTION

Installing, interconnecting, verifying, provisioning and activating state of the art telecommunications equipment are tasks that, to date, have largely been performed manually. Even for consolidated network elements with many nodes and inter-node links, current practice requires technicians to connect the numerous inter-node links, to provision individual ports using a network management interface, and to manually test the connectivity. For example, certain large capacity multi-stage switches are consolidated network elements with many shelves of switch matrices in each of a plurality of nodes. Each shelf comprises a plurality of port cards, each having a number of receive and transmit ports. For example, a bidirectional clos-like network switch with 8 port cards per I/O shelf, each of the 8 port cards having 8 receive and 8 transmit ports, with 5 I/O shelves and 20% expansion in the core, requires 768 inter-node links that interconnect 1536 ports. Each port has to be provisioned, and each inter-node link has to be tested.

The increasing complexity of consolidated network elements further contributes to the time required to provision such switches. Demand for versatile and interoperable equipment has led to the desire to integrate nodes from different manufacturers into consolidated network elements. The provisioning of a port to compensate for different requirements dependent on the characteristics of a node the port receives data from, adds complexity to the configuration of consolidated network elements. For example, protection schemes, and connection management requirements for inter-node links, may depend on the make of the originating equipment, the product line, and whether an inter-node link is provisioned to use a proprietary transfer protocol. The growing number of constraints on inter-node links, is also increasing the number of tests required for each consolidated network element. Further still, bandwidth allocation schemes and the interconnection of inter-node links to form consolidated signaling channels impose new constraints on adjacency of strands, strand bundles, and shelves.

It is also known in the art of optical transmission systems, that relatively inexpensive transmitters e.g. parallel optical interfaces (POIs) can be used over single mode strands of optical fibers, for very short reach (a few hundred meters). These strands may be bundled as single mode or multi-mode optical fibers (such as parallel very short reach (PVSR) strand bundles. While these offer an attractive solution to inter-nodal linkage, a number of problems complicate deploying bundles of single mode fiber in consolidated network elements. First, the requirement for testing each fiber strand in the bundle is onerous. Whereas prior art consolidated network elements had relatively few connectors, bundles of 12 strands in a network switch of the previous example yields 7680 strands to verify. Moreover, the strands are bundled in a certain sequence and that sequence needs to be verified, to ensure that the bundle order is preserved at each end. There is currently no known way of automating the provisioning of bundles of single mode or multi-mode optical fiber strands as inter-node links.

Existing methods for configuring consolidated network elements require that a technician use a network management interface to specify receive and transmit port parameters, in dependence on the source of the inter-node link. Determination of the source of inter-node links in consolidated network elements requires that a set of test signals be set up, input and transmitted. Usually a technician will supply the test signals to controllers at opposite ends of an inter-node link so that a first end transmits the test message, and a second end receives the test message. If the received message matches the expected test message, the test is successful. The technician then applies parameters for the receive port, accordingly.

There therefore exists a need for a method for automating the provisioning of receive ports of interconnected nodes in a consolidated network element. There also exists a need of a message for enabling inter-node connection discovery, particularly for interconnected nodes in a consolidated network element that are interconnected using one or more bundles of optical fiber strands, where many strands need to be discovered and tested. There is also a need of a method for enabling inter-node connection discovery in collocated telecommunications equipment using messaging.

SUMMARY OF THE INVENTION

An object of the invention is therefore to provide a method for enabling connection discovery between interconnected nodes in a consolidated network element that convey streams of data frames with payload and overhead parts. Advantageously the method permits automatic provisioning of receive ports of the nodes. Also advantageously the method permits derivation of a connectivity map of the nodes. The method also provides a means for verifying that connections between nodes conform to equipping rules for interconnecting at least nodes of one consolidated network element. Yet another advantage of the method of the present invention is that it enables bundles of single mode optical fiber strands to interconnect the collocated nodes, and provides a feasible means for provisioning and testing the strands.

Accordingly a method is provided for enabling inter-node connection discovery between interconnected nodes in a consolidated network element, such as synchronous optical network (SONET) or synchronous digital hierarchy (SDH) nodes that process streams of data frames with overhead and payload parts. The method involves inserting message bytes into the overhead parts of at least one data frame of each stream transmitted between any two of the interconnected nodes. Each message contains at least identifiers of: the equipment that controls the insertion; a transmit port through which the data frames containing the message was transmitted; a strand in a bundle of optical fiber strands through which the data stream containing the message was transmitted; and, a node type of the interconnected node. The streams are transmitted over respective strands of strand bundles, and received by receive ports of respective interconnected nodes, where the message bytes are extracted and processed.

The processing of each of the messages may be used to automatically set at least one port parameter of the receive port that received the data stream containing the message. The processing may also be used to verify integrity of the strand over which the data stream was transmitted. Using the strand identifier, the processing may also verify that the ordering of the strands in the bundle is preserved at the receiver end. If the processing of the messages received at respective groups of receive ports is coordinated, the processing may further be used to test adherence to equipping rules. The coordinated processing of all of the messages may be used to generate a connectivity map of the collocated nodes. If adjacency across a plurality of strands is required, contiguity can be verified by coordinated processing of the messages received at respective receiver ports. The message may further comprise a field for a final strand tag. If adjacency of strands is required in units other than that of the number of strands in a bundle, the final strand tag is set to indicate that the strand is the last in a contiguous set of strands. The inclusion of a final strand tag field in the message facilitates the verification of contiguity and completeness of groupings of strands.

Breach of contiguity or completeness of strands, failure to adhere to equipping rules, the connectivity map, failure of the bundle to preserve the strand order, or the integrity failure of a strand, may then be reported to a management interface.

If the nodes in the consolidated network element are adapted to perform bidirectional transport of streams, the method may further comprise steps of issuing replies from designated nodes in response to messages received on receive ports. The replies to the respective messages are issued over communications channels in the overhead of a data unit of respective streams transmitted by transmit ports paired at the designated nodes, with the respective receive ports. The replies contain the equipment, and port identifiers contained in the respective message. Sending the replies therefore permits interconnected nodes that receive the replies to verify that the inter-node links form bidirectional links that correspond with the pairing of ports of both collocated nodes. Any inconsistency between the pairing of ports and the bidirectional links may be reported to the management interface. Usually interconnected nodes are arranged in rows, and if so it may be preferable to designate the nodes of alternating rows to reply to the messages.

If the interconnected nodes comprise synchronous optical network (SONET) or synchronous digital hierarchy (SDH) equipment, a section trace formed of consecutive J0 bytes in the section/regenerator overhead of the data frames, may be used to convey the message. In this case, the replies may be transmitted through section data communications channel (DCC) of the overhead of the data frames.

According to an aspect of the invention, a message is provided that enables connection discovery between interconnected nodes in consolidated network elements that convey streams of data frames having overhead and payload parts. The nodes are interconnected by bundles of optical fiber strands, and the message is conveyed from a sending node, through a strand, to a receiving node. The message contains at least the following: an equipment identifier that identifies equipment of the sending node that controls the generation of the message; a port identifier that identifies a port of the sending node through which the message is transmitted; a strand identifier that identifies the strand; and an equipment type identifier that identifies a category of the equipment identified by the equipment identifier.

The message is preferably carried in the overhead of at least one data frame in the stream. The stream may be a stream of synchronous optical network (SONET) or synchronous digital hierarchy (SDH) frames, in which case the message may be transmitted in a J0 bytes of the frames.

Preferably the equipment identifier identifies the control equipment that most directly governs the transmit port In most nodes this is a shelf controller. In the absence of a shelf controller the sending node itself may be identified. The equipment identifier may be, for example, a media access control (MAC) address. As is known in the art, MAC addresses are assigned to shelves and nodes at the time of manufacture, in accordance with a standard.

The equipment type identifier preferably enables access to enough information regarding the characteristics of the node that sent the message, to ensure that the receiving node can accurately determine appropriate parameters to apply to a receive port at which the message is received. The information will therefore enable the receiving node to automatically set receive port parameters. Particularly, port parameters are set in accordance with an assigned protection scheme and connection management requirements of the stream received at the receive port.

The message may further include a final strand tag field to enable contiguity, completeness and sequence testing for groups of strands that form a consolidated channel.

According to an aspect of the invention, a method is provided for automatically provisioning a receive port of a first node adapted to receive a data stream of frames with overhead and payload parts from a transmit port of a second node. The first and second nodes are interconnected by an inter-node link. The method involves formulating and inserting a message of a predefined format into at least one predetermined byte of at least one data frame of the data stream. The message contains information regarding the format of the data stream that conveys the message. In accordance with the method, at least one data frame is transmitted over the inter-node link to the receive port, where the message is extracted and forwarded to a controller of the receive port. The controller then uses the information to automatically set at least one parameter of the receive port.

The port parameters may be set in accordance with a protection scheme, and connection management requirements for the data stream.

The method may further be adapted to verify at least one of the following: connection integrity, strand adjacency requirements, and equipping rules, in which case the message includes identifiers of the port and control equipment of the first node.

If the inter-node link comprises a bundle of fiber optic strands, the information in the message may further include data for verifying strand integrity, strand sequence, and contiguity and completeness of groups of strands.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The invention provides a method for enabling interconnected nodes in a consolidated network element to perform automated connection discovery. The discovery of connections may be used to automatically provision receive ports of the nodes, derive a connectivity map of the nodes, verify that connections between nodes follow configuration rules, and enable bundles of single mode optical fiber strands to be used to interconnect the collocated nodes.

Figures 1, 2:
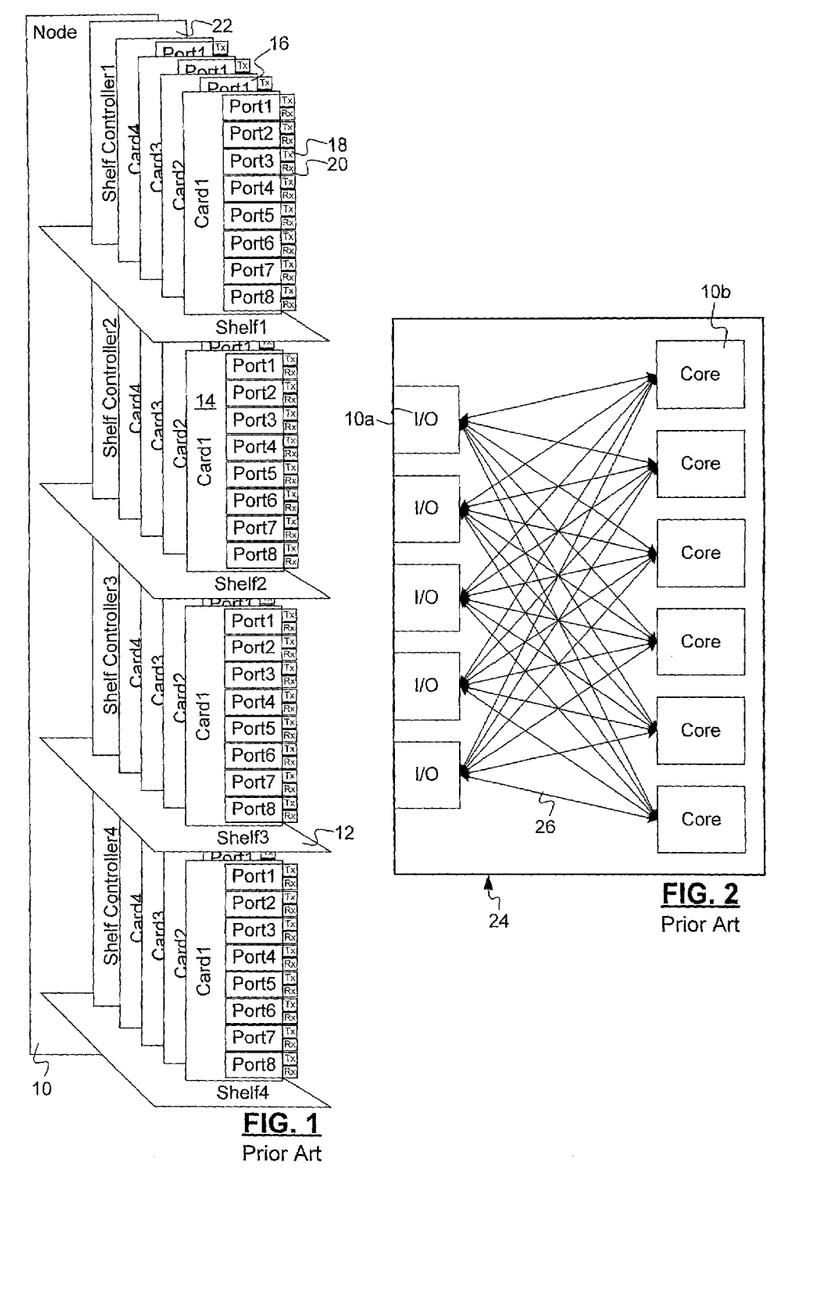
FIG. 1 is a schematic diagram illustrating a generic structure for a telecommunications node in accordance with the prior art.
FIG. 2 is a block diagram schematically illustrating connections in a consolidated network element in accordance with the prior art.

FIG. 1 schematically illustrates a generic structure of a node 10 in an optical network. A node 10 typically has a plurality of shelves 12 (shelves 1–4 illustrated). As is known in the art, each shelf 12 is an independent switching module of the node 10 that permits switching of data streams between port cards 14 (cards 1–4 illustrated for each shelf 12). Each port card 14 has a number of ports 16 (ports 1–8 illustrated for each port card 14). The node 10 illustrated is bidirectional, and so each port 16 includes a respective transmit port (Tx) 18 and a receive port (Rx) 20. The operation of each shelf 12 as a switching module involves switching data streams between Rx ports 20 and Tx ports 18. A shelf controller 22 on each shelf 12 is responsible for controlling the intra-shelf switching. Each Tx port 18 and Rx port 20 is configured using a plurality of parameter settings. The parameter settings depend on the format of the data frames that the port is provisioned to send and receive. The frame format dictates a protection scheme for, and connection management requirements of, the data stream received at respective ports. The parameter settings of the ports control operating conditions at the ports, such as an action to take in the event of a loss of signal, and the monitoring activities to perform with overhead parts of the data frames of the received data stream, for example.

FIG. 2 schematically illustrates connections in a consolidated network element (CNE) 24 of a type known in the art. The CNE 24 includes a plurality of input/output (I/O) nodes 10a, and a plurality of core nodes 10b that are interconnected by inter-node links 26.

The I/O nodes 10a are different from core nodes 10b in that they are adapted to translate between a data frame format used in the network to a data frame format used within the CNE on the inter-node links 26, which may be a proprietary frame format. As the inter-node links 26 span very short distances (200–500 m) in comparison to longer-reach network links, and as the network potential restricts use of an overhead portion of the data frames, the format of frames exchanged within the CNE may be different, both on the physical transmission layer, and in the format of the data frames. The transfer rate may also be different and/or have a different distribution of wavelength division multiplexing and time division multiplexing units.

Many procedures are required to configure and initialize the nodes 10, and to ensure that the nodes 10 are correctly interconnected. As is known in the art, interconnections between the nodes 10 within the CNE 24 adhere to equipping rules. The ports of CNE 24 are uniquely identified by an ordered triplet (n,s,p), wherein: n identifies the node, s identifies a number of the shelf in the node 10, and p identifies a port. Equipping rules are restrictions of bijective mappings from (n,s,p) to (n,s,p) such that every Rx port 20 is mapped to a Tx port 18. There are many simple rules that are used to formulate equipping rules, such as, for instance that layer n node of a multilayer CNE is connected only to layer n−1 or layer n+1 switches. Generally equipping rules strive to reduce the amount of blocking between the nodes by distributing the data streams as evenly as possible across a next layer of nodes. In conflict with this, however, is a desire to maintain contiguity of inter-node links that form consolidated channels. As is known in the art, to maintain consolidated channels formed of multiple inter-node links, the links generally need to be processed by the same shelf, so that data frame synchrony can be maintained. There are also other factors taken into account when formulating equipping rules for various CNEs, as is known in the art.

The equipping rules may be verified at many levels. For example, at a port card level, a pattern of sources of 8 received data streams can be used to verify locally the adherence to equipping rules, assuming the equipping rules are systematic. For instance, if a rule asserts that each of 8 second layer nodes (1–8) receives a data stream from a port numbered (1–8, respectively) on respective port cards, the receipt of a data stream from a port having a different number would indicate a failure to adhere to the equipping rule. Generally, to be sure that shelves or nodes have not been swapped, the equipping rules are tested at a higher level, as well. A CNE connectivity map is generated at a highest level, and each port is compared with the connectivity map to ensure that the equipping rules have been followed.

Figure 3A:
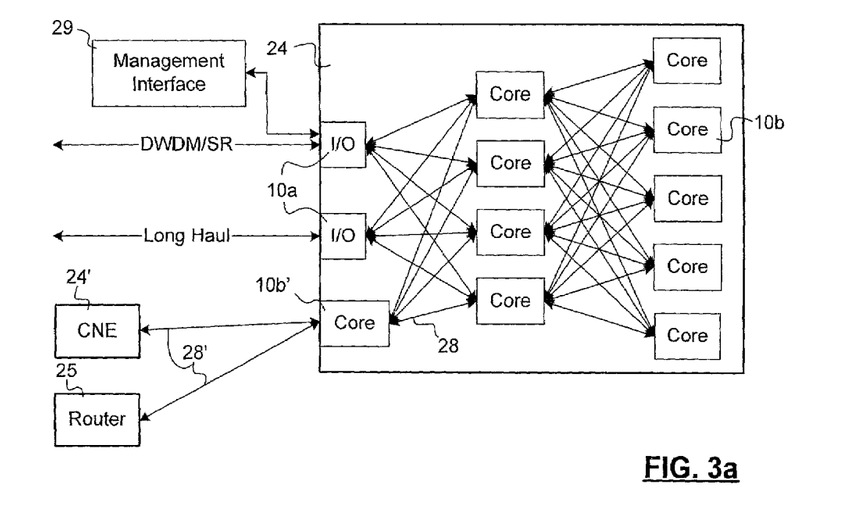
FIG. 3 is a block diagram schematically illustrating connections between a plurality of collocated telecommunications nodes.

FIG. 3a schematically illustrates connection of a plurality of collocated nodes that are configured as CNEs. One CNE, CNE 24 includes multiple layers of core nodes 10b and a layer of I/O nodes 10a. The inter-node links between the nodes of the CNE 24 are bundles of optical fiber strands 28.

A core node 10b' is a part of the I/O layer. The core node 10b' is adapted to exchange data streams with a collocated CNE 24' and a collocated router 25, via respective bundles of optical fiber strands 28'. The network traffic exchanged with the core node 10b' may conform with the network frame format, even if the physical transmission layer is different. If so, I/O ports of the CNE 24' and router 25 are adapted to translate between a proprietary frame format, a frame format used by the router 25, and a frame format that conforms with the network protocol, if different. The standard frame format is transmitted over bundles of optical fiber strands 28' to the core node 10b'. The frame format used internally by the CNE 24, the CNE 24', and the router 25 may all be different. The internal frame formats are often proprietary.

As illustrated, the I/O nodes 10a receive long haul transmission fiber and dense wavelength division multiplexed, short reach (DWDM/SR) fiber which support various data transmission rates known in the art.

Figure 3B:
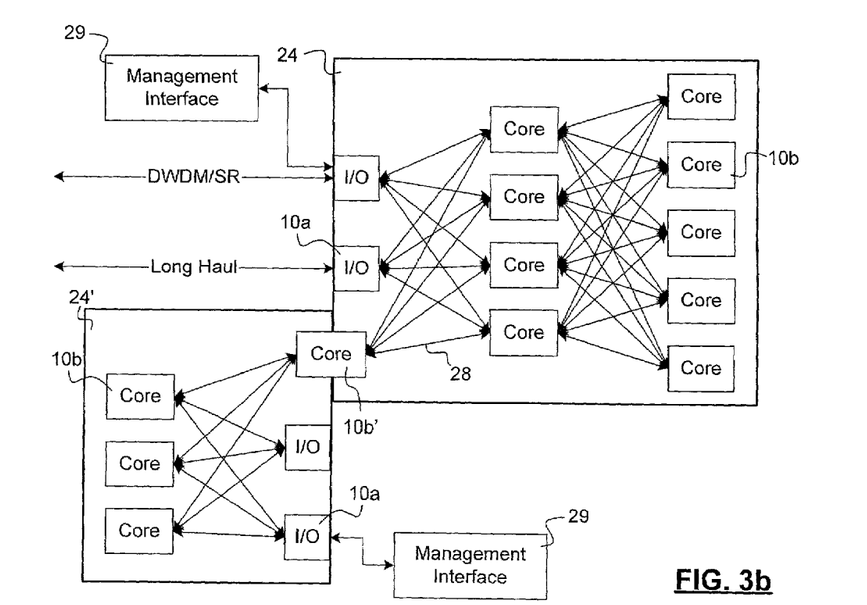

FIG. 3b illustrates another configuration of two collocated CNEs that are interconnected via a core node 10b. In this configuration, none of the bundles of intra-switch optical fiber strands is required to use the network frame format. Each of the CNEs 24 and 24' may, however, use a proprietary frame format, connection management interface 29, and CNE controller.

Figure 4:
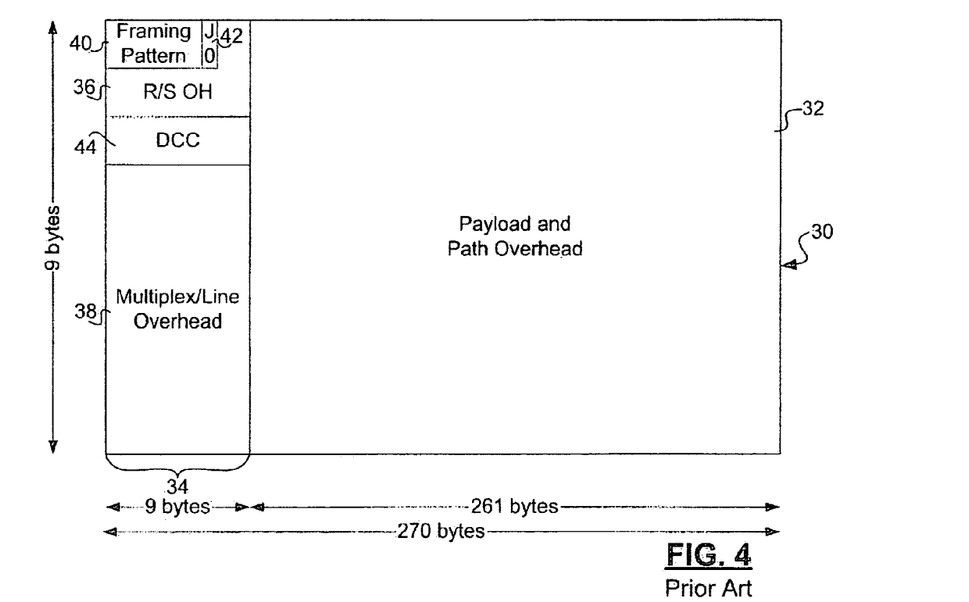
FIG. 4 is a schematic diagram illustrating a data frame used in accordance with the present invention.

FIG. 4 is a schematic diagram of a structure of a prior art synchronous transport signal (STS)-3 frame, in accordance with the synchronous optical network (SONET) protocol, and a synchronous transport mode (STM)-1 frame, in accordance with the synchronous digital hierarchy (SDH) protocol. The frame 30 has a 2,349 byte payload part 32, and a 81 byte frame overhead part 34. In addition, 27 bytes of the payload part 32 are used for path overhead, while the remaining 2,322 bytes are reserved for payload data. The frame overhead part 34 is partitioned into regenerator or section overhead (R/S OH) 36, and multiplex or line overhead 38. The R/S OH 36 occupies one third of the overhead part 34, and marks a beginning of the frame using a framing pattern 40. As is known in the art, 3 A1 bytes, followed by 3 A2 bytes are generally used for the framing pattern (A1=hex F6, and A2=hex 28). Immediately following the framing pattern is a byte called the J0 byte 42. Both the SONET and the SDH standard provide a communications channel using the J0 byte, called a section trace. The SONET standard defines a 16-byte-long section trace message that is generated from J0 bytes extracted from 16 consecutive frames. The SDH standard defines a 16-byte-long section trace message. A last third of the R/S OH 36 is a data communications channel (DCC) 44 defined by both standards.

Figure 5:
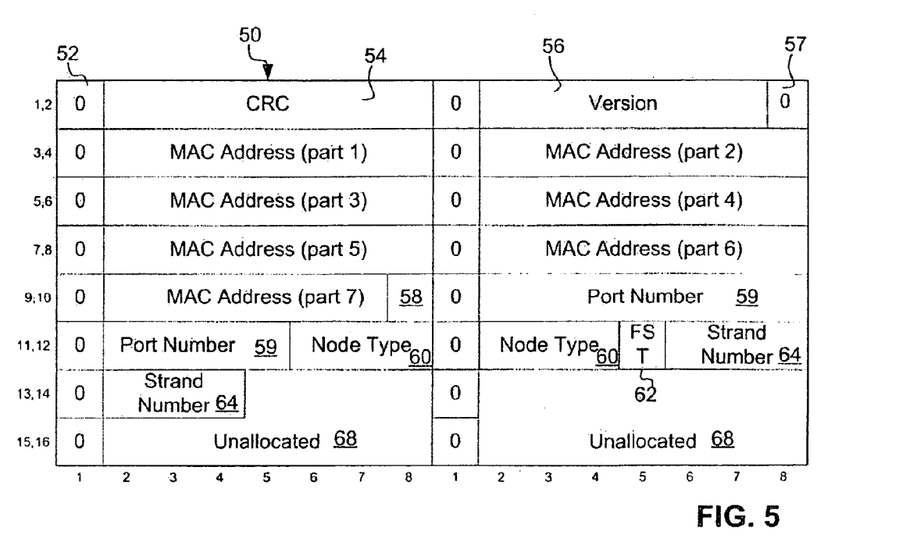
FIG. 5 is a schematic illustration of a message format in accordance with the present invention.

FIG. 5 is a schematic diagram of a 16 byte format for a message 50 in accordance with the invention. The section trace message in accordance with the SONET standard has 105 usable bits, because the first bit 52 of each of the 16 bytes is set to zero, and a remainder of the first byte is reserved for a cyclic redundancy check 54 to provide error detection for section trace messages. Of the 105 available bits, a six bit version marker 56 is inserted at a beginning of the message. The version marker 56 is used to make the message format backwards compatible, and may also be optionally used as a vendor tag. The last bit in the second byte is a null bit 57. The next successive usable bits of the message are used to convey a media access control (MAC) address 58, which is a 48 bit identifier of telecommunications equipment. The MAC address 58 identifies the shelf 12 (FIG. 1) that contains the Tx port 18 over which the message was transmitted, unless the structure of the node is other than as illustrated in FIG. 1, or the shelf does not have a MAC address, in which case the MAC address of the node is inserted. The reason for using the MAC address of the shelf is to associate the message with the most local equipment that can be automatically identified when the equipment is turned on. The MAC address is inserted in the usable bits of the 3–8$^{th}$ bytes, inclusively, and the first 6 bits of the 9$^{th}$ byte. A 12-bit port number 59 of a port 16 (FIG. 1) through which the message was transmitted, begins in the last bit of the 9$^{th}$ byte, continues through the usable bits of the 10$^{th}$ byte and the first four bits of the 11$^{th}$ byte of the message. A 6-bit node type 60 of the equipment uses 3 bits in the 11$^{th}$ byte and 3 bits in the 12$^{th}$ byte. The node type 60 identifies relevant structure, capacity, and mode of the use of the identified equipment. A one-bit final strand tag (FST) 62 follows the node type 60 in the 12$^{th}$ byte. The FST 62 is set to indicate that a strand through which the message is transmitted is a last of a group of strands. The FST is useful for testing the completeness of the group. A 6-bit strand identifier 64 follows in the last 3 bits of the 12$^{th}$ byte and the first 3 bits of the 13$^{th}$ byte. The strand identifier 64 indicates a strand number of a strand through which the message was transmitted. The remaining bytes 68 of the message are currently unallocated. It should be understood by those of skill in the art that many of the details of the message structure are not essential to its function in various embodiments of the invention, and that the message may be carried in different overhead bytes in other frame sections, while enabling the same benefits.

Figure 6:
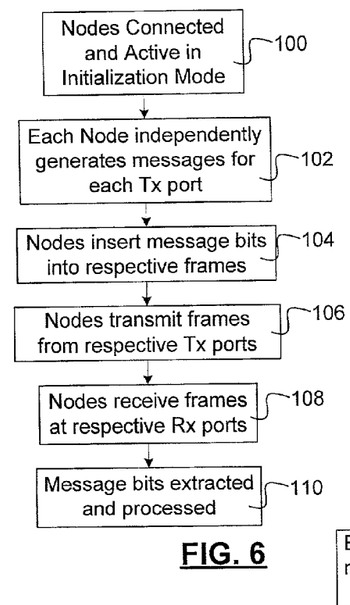
FIG. 6 is a flow chart illustrating principal steps in a method in accordance with the present invention.

FIG. 6 is a flow chart illustrating principal steps involved in a method in accordance with the invention for using the message illustrated in FIG. 5 to enable system layout and testing (SLAT) and configuration management for consolidated network elements 24. In step 100, nodes 10 (FIG. 1) of a consolidated network element 24 are interconnected and activated in an initialization mode. Each node 10 independently generates respective messages 50 (FIG. 5) to be transmitted by respective Tx ports 18 (step 102). Respective bits of messages 50 are, in step 104, inserted into respective data frames 30 (FIG. 4). The data frames 30 are transmitted by respective Tx ports 18 (step 106) to the respective Rx ports 20 to which the respective Tx ports 18 are connected. The respective Tx ports 18 of the nodes 10 receive the data frames in step 108, and the message bits are extracted and processed in step 110. Where and how the message is processed is a matter of design preference. The processing may involve network management level computing, and/or control of CNEs 24, nodes 10, shelves 12, or Rx ports 20 and Tx ports 18. If the message processing is not performed by a management interface provided for technicians who interconnect the respective nodes, results of the message processing are preferably reported to the management interface.

Figure 7:
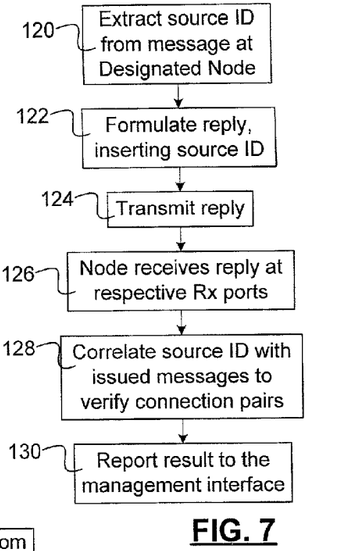
FIG. 7 is a flow chart illustrating principal steps involved in processing a message in accordance with the invention to test links interconnecting paired ports.

FIG. 7 is a flow chart illustrating principal steps involved in processing a message 50 (step 110 of FIG. 6) in accordance with the invention to verify that bidirectional links interconnect corresponding paired ports of nodes 10. As is illustrated in FIG. 1, the ports 16 of port cards 14 that perform bidirectional transport of data frames, are paired. It is a requirement of bidirectional networks that each paired port 16 be interconnected by respective inter-node links 26, so as to form loops including the Tx,Rx pairs of connected nodes 10. Uncorrelated messages cannot detect an improper connection of inter-node links 26 connected to paired ports. Correlation of the messages is therefore required, but only one correlation needs to be performed for each candidate loop. It is therefore economical and simple to issue a reply to the message from one end of each candidate loop. This can be simply arranged by designating alternating layers of nodes 10 within a layered CNE 24, for example, to issue the reply message.

In step 120, information contained in the message 50 received at an Rx port 20 of a designated node 10, is extracted. The information necessary to identify the source of the message, the equipment ID (i.e. the MAC address 58), and the port number 59, in particular are extracted from the message, step 120. In step 122, the source identification information is inserted into a reply formulated in response to the message 50. In step 124, the reply is issued to the equipment identified in the message. The purpose of the reply is to permit the correlation of ports paired with each other via bidirectional inter-node links. Any message exchanged from a recipient of the message 50 to a source of the message 50, that contains the pairing of ports at the receiving equipment, will satisfy these requirements. Advantageously the reply can be inserted into a data communications channel (such as section DCC 44) of the data frame transmitted by a Tx port 18 that is paired with the Rx port 20 at which the message 50 was received. An identifier of the pairing of the ports of the designated equipment is not required. Rather, the action of automatically conveying the reply through the paired port ensures accurate indication of port pairing to the equipment that sent the message 50. Of course, if the paired ports are incorrectly connected, the equipment that sent the message 50 will not receive the reply, in which case the receiving equipment may generate an error message, and forward the error message to the management interface. The equipment that sent the message, but cannot correlate the message with the reply, may also generate and forward an error to the management interface.

In step 126 a node 10 receives the reply through the DCC 44 or an equivalent internode communications channel at a Rx port 20. The node 10 extracts the source identification information and correlates it with messages it transmitted. If the Rx port 20 is paired with the Tx port 20 identified by the source identification information, bidirectionality of the links is verified. Otherwise, the pairing of the ports were not respected by the connections of the inter-node links 28 (step 128). The node may report a successful correlation to the management interface, or alternatively, only error messages may be forwarded to the management interface, in step 130.

One use for the automatic connection discovery permitted by the message 50 and using the method of FIG. 6 is therefore the automatic detection of bidirectional port pairs that are not interconnected with respective port pairs of other nodes connected to a CNE 24.

Figure 8:
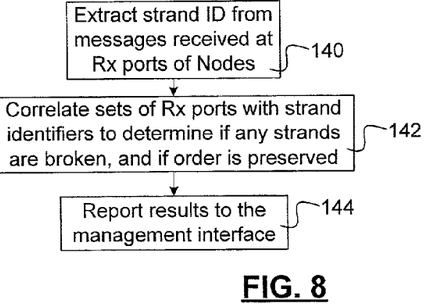
FIG. 8 is a flow chart illustrating principal steps involved in processing a message in accordance with the invention for verifying strand integrity and strand sequence in a fiber bundle.

FIG. 8 illustrates principal steps involved in processing a message 50 (step 110 of FIG. 6) to perform strand-level testing of the inter-node links (i.e. to verify strand integrity and preservation of strand order within a strand bundle). This involves testing to determine whether individual strands transmit within tolerances, and that the strands in the strand bundle are connected in a correct order. Adjacency testing of strands that are consolidated to form a broadband channel may also be performed, depending on the switching configuration of the connected nodes. The preservation of strand order in strand bundles is more complicated if one or more bundles are cross-connected by a patch panel intermediate the nodes.

Since many commercially available strand bundles are sheathed bundles with optical interfaces at opposite ends connected to respective strands, the ordering of the strands must be preserved at both ends. If the optical interfaces are misaligned or defective at either end, the bundled strands may be incorrectly identified. The misidentification of strands, and the incorrect ordering of strands can cause errors in CNEs 24 that switch data streams on a finer granularity than that of the strand bundle. Even if the switching granularity is that of a bundle of strands, the ordering of the strands may need to be preserved across the CNE 24, depending on the format of the data frames.

In step 140, an issued strand number, which indexes the strand through which a message 50 was sent, is extracted from the message 50. If all of the strands received messages, no strand integrity loss is detected. The node 10 that receives a message at an Rx port 20 correlates its assigned strand number with the received strand number (i.e. the strand through which the message was sent), in step 142. If the assigned strand number matches the received strand number, for each of the strands connected to the Rx port 20, the strand order is verified. If the assigned and received strand numbers do not match, a strand bundle error is detected. A message reporting the results 144 of the strand-level test is sent to the management interface 29 (FIG. 3a).

Figure 9:
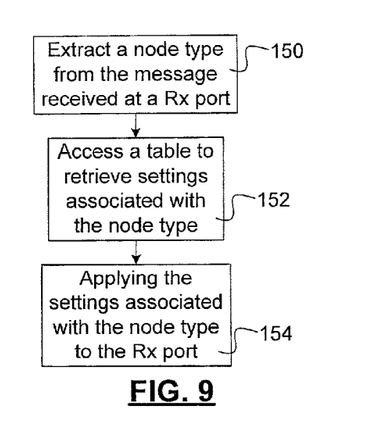
FIG. 9 is a flow chart illustrating principal steps involved in processing a message in accordance with the invention to automatically set parameters at a receive port.

FIG. 9 illustrates principal steps of processing a message 50 (step 110 of FIG. 6), to automatically set port parameter settings of a receive port. The receive ports of CNE 24 generally receive streams of data frames that are laden with signaling information. The information received depends on the format of the data frames, and, a mode in which the data frames are being sent. Consequently, a byte in a frame overhead may be interpreted differently by different nodes 10. While equipment that is configured to use a standard protocol, such as the SONET or SDH, may use only a few types of frame (section, line and path termination schemes), many manufacturers transmit standard data frames, but use the frame structure in proprietary ways. Generally proprietary uses of overhead frame bits are hidden from users. It is therefore important to distinguish the required interpretation of overhead bytes in frames, in order to ascertain connection management requirements, and protection schemes to apply to a data frame. The connection management requirements include monitoring and controlling signaling between nodes using, overhead bytes in the frames. Operations such as those that are to be applied in the event of a loss of signal, are included in the connection management requirements. As is known in the art, protection schemes are used in standards to provide dynamic rerouting of connections in the event of a connection failure.

In step 150 an indicator of node type 66 is extracted from the message 50. The node type 66 identifies relevant features of the equipment required to ascertain the connection management requirements of the inter-node link 26 through which the message 50 was received. A table relating the node type 66 to the connection management requirements is accessed by a processor, in step 152. The table contains settings which, in step 154, are applied at the Rx port 20 at which the message 50 was received. The node type information may supply configuration requirements of a Tx port 18 that transmitted the message 50, or other information, as required. Preferably results of the automatic port assignment, including any ports for which settings are not available or recognized, are reported to the management interface 29.

Figure 10:
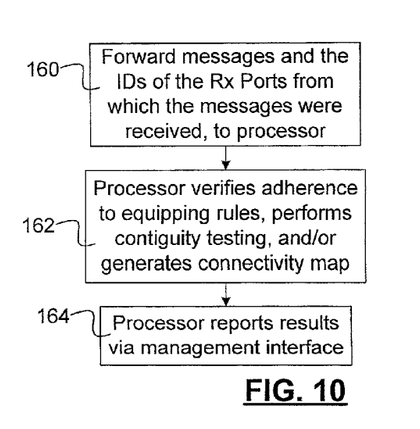
FIG. 10 is a flow chart illustrating principal steps involved in processing messages in accordance with the invention for using connection autodiscovery information to select verification and maintenance procedures.

FIG. 10 illustrates principal steps involved in processing a message 50 (step 110 of FIG. 6), to enable connection autodiscovery information to be used for selected verification and management procedures. In particular, verification of adherence to equipping rules, contiguity testing and generation of a connectivity map are enabled.

Equipping rules, as previously explained, are used to govern interconnection of nodes in CNEs 24, wherein a CNE controller executes a management tool for governing constituent nodes. The equipping rules relate to permissible interconnections of Tx ports 18 of the CNE 24 to respective Rx ports 20. The many levels of equipping rule testing may be performed by different processors in some CNE configurations, but it is assumed that a management interface, or another processor that can communicate with each of the Tx ports 18 and Rx ports 20 of interconnected nodes, performs this function, and therefore may perform a complete test of adherence to the equipping rules.

The connectivity map is a one-to-one mapping from the Tx ports 18 of connected nodes (except for output ports that are provisioned to interconnect nodes that are not connected to core nodes of the CNE) to Rx ports 20 of the connected nodes (except for the input ports that are provisioned to interconnect nodes that are not connected to core nodes of the CNE). A connectivity map can be used to verify adherence to equipping rules.

Contiguity testing is used to ensure that channels formed of consolidated inter-node links are conveyed to adjacent Rx ports 20 of a common shelf, for instance. The requirements imposed on inter-node link connectivity are verified with contiguity testing.

In step 160 messages 50 received at respective Rx ports 20 of the interconnected nodes are forwarded with identifiers of the respective Rx ports 20, to a processor. The processor may then test adherence to the equipping rules, generate a connectivity map, and/or perform contiguity testing (step 162). In step 164, the processor reports the results of the verification and management procedures to the management interface 29.

The invention therefore provides a mechanism for facilitating system layout and testing (SLAT) as well as configuration management of consolidated network elements. SLAT is significantly simplified because receive ports autoconfigure on initialization to match requirements of connected transmit ports. Strand misordering is also detected and reported to eliminate tedious manual setup and test procedures.

The embodiment(s) of the invention described above is (are) intended to be exemplary only. The scope of the invention is therefore intended to be limited solely by the scope of the appended claims.

We claim:

1. A method for enabling system layout and testing (SLAT) and configuration management of nodes in a consolidated network element (CNE) comprising steps of:
    inserting into an overhead part of at least one data frame in each data stream sent from a first to a second interconnected node in the CNE, and identifier of equipment that controls the insertion, a transmit port that transmitted the data frame, a strand through which the data frame was sent and, and equipment type of the identified equipment;
    transmitting each of the data frames from respective transmit ports, through respective strands, to respective receive ports of the second node;
    receiving the data frames at the respective receive ports;
    extracting the overhead parts and processing the overhead parts to assemble messages useful for SLAT and configuration management; and
    using the equipment type for automatically setting at least one port parameter setting of the receive port at which the message was received.

2. A method as claimed in claim 1 further comprising a step of using the respective strand identifiers to verify an integrity of a strand over which the data frames were transmitted.

3. A method as claimed in claim 2 further comprising a step of verifying a sequence of the strands in a strand bundle interconnecting the first and second nodes.

4. A method as claimed in claim 3 further comprising a step of performing completeness verification for groups of strands in the strand bundle, and the messages transmitted over last strand in a group of strands that form a consolidated channel include final strand tags.

5. A method as claimed in claim 4 further comprising a step of reporting to a management interface a detected broken strand, a failed verification of a strand bundle sequence, and failed contiguity verification for strands in the strand bundle.

6. A method as claimed in claim 1 wherein the step of extracting and processing the overhead parts to assemble respective messages comprises a step of using respective port and equipment identifiers received at a plurality of respective receive ports to perform at least one of: verification of adherence to equipping rules; contiguity verification of strands in strand bundles; and generation of a connectivity map of at least some of the collocated nodes.

7. A method as claimed in claim 6 further comprising a step of reporting to a management interface at least one of:
    a detected conflict with programmed equipping rules that are associated with an equipment type of the identified equipment;
    a breach of contiguity bundles of optical fiber that are assigned to be grouped; and
    the generated connectivity map.

8. A method as claimed in claim 1 wherein the nodes are adapted to perform bidirectional transport of data streams, and the method further comprises steps of:
    extracting at least equipment and port identifiers from a message received at a receive port of a node;
    inserting the respective equipment and port identifiers into a reply to the message; and
    transmitting the reply using a communications channel in the overhead part of a data frame sent from a transmit port of the node, the transmit port being a port paired with the receive port from which the message was received;
        whereby a correlation of the reply received at a port with identifiers assigned to the port and sent in the message enables the node that receives the reply to verify that an inter-node link forms a bidirectional link that conforms with the intended pairing of ports in the CNE.

9. A method as claimed in claim 8 further comprising a step of reporting to a management interface any detected mismatch between the intended pairing of ports in the interconnected nodes and the bidirectional links discovered between the interconnected nodes.

10. A method as claimed in claim 8 wherein the data frames comprise frames of one of a synchronous optical network (SONET) and a synchronous digital hierarchy (SDH) protocol, and the step of inserting into overhead parts comprises a step of inserting respective bits of the message into a section trace formed of consecutive J0 bytes in a section/regenerator overhead portion of the frames.

11. A message for enabling inter-node connection discovery between interconnected nodes of a consolidated network element (CNE) that convey data frames with overhead and payload parts, the nodes being interconnected by bundles of optical fiber strands, the message being conveyed from a sending node, through a strand, to a receiving node, the message comprising:
    an equipment identifier assigned to equipment of the sending node that controls generation of the message;
    a port identifier that identities a transmit port of the sending node that transmits the message;
    a strand identifier, identifying a strand over which the message is transmitted; and an equipment type identifier that identifies a category of the control equipment and enables a retrieval of sufficient information respecting a sender of the message to ensure that the receiving node can determine port settings to apply to the receive port at which the message was received.

12. A message as claimed in claim 11 wherein the message is carried in a overhead part of at least one data frame.

13. A message as claimed in claim 12 wherein the data frames comprise frames of one of a synchronous optical network (SONET) and a synchronous digital hierarchy (SDH) protocol, and the message is sent one byte per frame in consecutive J0 bytes of the frames.

14. A message as claimed in claim 12 wherein the equipment identifier identifies one of a shelf controller for the transmit port and the sending node.

15. A message as claimed in claim 14 wherein the equipment identifier comprises a media access control (MAC) address.

16. A message as claimed in claim 14 further comprising a final strand tag field used to facilitate contiguity and sequence testing of groups of strands that form a consolidated channel.

17. A message as claimed in claim 11 wherein the information defines a protection scheme, and connection management requirements for the receive port.

18. A method for automatically provisioning a receive port of a second node adapted to receive data frames with overhead and payload parts from a transmit port of a first node, the first and second nodes being interconnected in a consolidated network element (CNE), the method comprising steps of:

formulating and inserting a message of a predefined format into at least one predetermined byte of the overhead part of at least one data frame, the message containing information respecting the first node including an identifier of equipment controls the insertion and an equipment type of the identified equipment;

transmitting the at least one data unit to a receive port of the second node;

extracting the message from the at least one data frame at the receive port; and using the equipment type in the message to automatically set at least one port parameter setting of the receive port.

19. A method as claimed in claim 18 wherein the step of using the information comprises a step of provisioning the receive port to conform to connection management requirements.

* * * * *